2,999,836
REACTION PRODUCT OF N-GLYCIDYL-PHTHAL-
IMIDE AND A DIANHYDRIDE COMPOUND,
PROCESS FOR PREPARING SAME, AND MODI-
FICATION THEREOF
Richard E. Ludwig, Wilmington, Del., assignor to E. I.
du Pont de Nemours and Company, Wilmington, Del.,
a corporation of Delaware
No Drawing. Filed Apr. 16, 1959, Ser. No. 806,758
12 Claims. (Cl. 260—42)

The present invention relates to novel compositions valuable as molding and potting compositions, adhesives, laminating agents and the like. More specifically, the present invention relates to a composition of N-glycidylphthalimide and a dianhydride compound.

Resinous compositions having good high-temperature properties are needed for many applications. For example, for the encapsulation of electronic circuits, cured resins are desired which have high resistance to distortion by heat and high resistance to loss of weight at elevated temperatures, in addition to good chemical and solvent resistance.

Monoepoxides, such as glycidyl ethers and esters, recently have become available in the epoxy field. Monoepoxides, when compared with polyepoxides, are more economical to produce. However, it has been found that the glycidyl ethers and esters, when reacted with a curing agent such as an amine or an anhydride to give resinous compositions, do not give the high-temperature stability desired in the field. Therefore, a monoepoxide compound which upon curing gives resinous compositions having good stability at high temperatures is needed.

Also, compositions having a long pot life at room temperature have been long sought in the epoxy field. Pot life is the time during which the composition is flowable enough for ease in handling. When amines, such as ethylene diamine, are used as curing agents, the pot life of an epoxy-amine composition is so short, even at room temperature, that the curing agent and epoxy resin cannot be premixed and stored. Since the composition must be used immediately or within a very short period after the components are mixed, a "two-package system" is required. The use of an acid anhydride curing agent, because of its lower reactivity, can to some degree extend the pot life of a liquid epoxy composition but not for so long a period as is desirable. Solid epoxy resins, i.e., polymers prepared by the reaction of an epihalohydrin, such as epichlorohydrin, and a polyhydric alcohol or phenol, are also used in combination with anhydride curing agents; however, these solid polyepoxides have average molecular weights generally greater than 500 and most probably in the thousands range. Because of the high molecular weight of these polymers, solvents or diluents are generally necessary in the compositions with a resultant increase in the cost of the composition.

Because of the lower reactivity of anhydrides as compared with amines, long cure periods are required for the formulations containing only anhydride curing agents and, in some instances, are so long as to make the composition economically unattractive. To accelerate the rate of cure of epoxides with anhydrides, a catalyst, such as an amine, is generally included in the formulation but only with a resultant sacrifice of pot life.

A relatively low-cost "one-package system" is needed which has an indefinite pot life at room temperature and which can be converted readily to resinous compositions having greatly improved high-temperature stability and good chemical and solvent resistance.

Accordingly, an object of this invention is the production of new and relatively low-cost compositions of matter valuable as molding and potting compositions, adhesives, laminating agents and the like. Another object of the invention is to provide an epoxide and curing agent composition in the solid state which has an indefinite pot life at room temperature and which can be converted in relatively short periods and without the aid of a catalyst to novel resinous compositions. A still further object of the present invention is to provide novel resinous compositions having high heat distortion temperatures and good chemical and solvent resistance by the reaction of N-glycidylphthalimide and a dianhydride compound.

In accordance with the present invention, a composition is prepared from N-glycidylphthalimide and a dianhydride compound, the total amount of dianhydride being such that from about 0.5 to 1.5 anhydride groups are provided for each epoxide group.

Resins from the compositions of my invention may readily be prepared by dissolving a dianhydride compound in N-glycidylphthalimide and thereafter curing the composition thus formed at a temperature from about 80 to about 250° C.

N-glycidylphthalimide is a white crystalline solid having a melting point of about 99.8–101.0° C. This monoepoxide may be prepared conveniently and economically in high conversions by the reaction of potassium phthalimide and epichlorohydrin. The tertiary nitrogen atom of N-glycidylphthalimide is believed to contribute to high-temperature stability of the cured resinous compositions. While I do not wish to be limited to any theoretical explanation, the glycidyl group which is linked to the benzene ring through the nitrogen atom is thought to have a lesser degree of flexibility than if it were linked to the benzene ring through an ether oxygen. Above the melting point of N-glycidylphthalimide, it functions as a solvent-reactant for the higher-melting dianhydride compound, and thus the need for additional diluents or solvents in the formulation is precluded, although they may be included.

The following examples illustrate specific embodiments of the method of preparation of the compositions in accordance with the present invention. All of the cured compositions prepared according to the following examples exhibited good chemical and solvent resistance. The examples are intended to be illustrative only and are not to be construed as limiting the invention in any manner.

The heat distortion temperatures of the cured resinous compositions were determined by subjecting a test bar to a fiber stress of 264 pounds per square inch and determining the temperature at which sufficient softening occurred to permit a deflection of 10 mils (ASTM Test Method D648–45T, as described in ASTM Standards, 1955 edition, part 6, pages 296–299).

*Example 1*

To 20.3 parts of N-glycidylphthalimide was added 10.9 parts of pyromellitic dianhydride. This combination provides one anhydride group for each epoxide group. The solid mixture was heated until the clear point (ca. 160° C.) was reached. (The clear point is the temperature at which the pyromellitic dianhydride is completely dissolved in the mixture.) The mixture was then poured into a mold (preheated to a temperature between 170 and 180° C.) and cured at 180° C. for a period of 4 hours. A clear, transparent, light-colored resinous composition having a heat distortion temperature of 227° C. was obtained.

When compositions containing the same proportions of reactants as above were cured at 180° C. for periods of ½, 12, and 18 hours, clear, transparent, light-colored resinous compositions were also obtained having, respectively, heat distortion temperatures of 190, 231, and 232° C.

When a composition containing the same proportions of reactants as above was cured at a temperature of 220° C. for a period of 24 hours, a clear, transparent, light-colored resinous composition having a heat distortion temperature of 240° C. was obtained.

When the cure temperature was lowered to 120° C. for a composition containing the same proportions of reactants as above and the cure period was 24 hours, a clear, transparent, light-colored resinous composition having a heat distortion temperature of 164° C. was obtained.

When a composition containing the same proportions of reactants as above was stored in a sealed container at room temperature for six months, the mixture was still free-flowing, thus indicating that no reaction had occurred and that the composition can be stored indefinitely at room temperature.

*Example 2*

The procedure of Example 1 was followed except that 12.0 parts of pyromellitic dianhydride was added to 20.3 parts of N-glycidylphthalimide. This combination provides 1.1 anhydride groups for each epoxide group. The clear point of the mixture was 164° C. When the mixture was cured at 180° C. for a period of 18 hours, a clear, transparent, light-colored resinous composition having a heat distortion temperature of 227° C. was obtained.

When the cured resinous composition was exposed to 200° C. for a period of approximately 200 hours, the weight loss was only 0.55%.

*Example 3*

The procedure of Example 1 was followed except that 9.8 parts of pyromellitic dianhydride was added to 20.3 parts of N-glycidylphthalimide. This combination provides 0.9 anhydride group for each epoxide group. The clear point of this mixture was 155° C. When the mixture was cured at 180° C. for a period of 18 hours, a clear, transparent, light-colored resinous composition having a heat distortion temperature of 230° C. was obtained.

*Example 4*

The procedure of Example 1 was followed except that 8.2 parts of pyromellitic dianhydride was added to 20.3 parts of N-glycidylphthalimide. This combination provides 0.75 anhydride group for each epoxide group. The clear point of this mixture was 139° C. When the mixture was cured at 180° C. for a period of 18 hours, a clear, transparent, light-colored resinous composition having a heat distortion temperature of 164° C. was obtained.

*Example 5*

The procedure of Example 1 was followed except that 3.8 parts of 2,2 - bis[4-(2-hydroxypropoxy)phneyl]propane as a modifier was added in addition to the components in the quantities indicated. This combination provides one anhydride group for each epoxide group and 0.1 hydroxyl group for each anhydride group. The clear point of this mixture was 145° C. When the mixture was cured at 180° C. for a period of 24 hours, a resinous composition having a heat distortion temperature of 166° C. was obtained.

*Example 6*

An epoxidized silicone resin, 1,3-bis[3-(2,3-epoxypropoxy)propyl]tetramethyldisiloxane in the amount of 4.5 parts was added as modifier to 15.2 parts of N-glycidylphthalimide and 10.9 parts of pyromellitic dianhydride. This combination also provides 1 anhydride group for each epoxide group. The mixture was heated until the clear point (167° C.) was reached. The mixture was then poured into a mold preheated to a temperature between 170 and 180° C. and cured at 180° C. for a period of 24 hours. A cured resinous composition having a heat distortion temperature of 189° C. was obtained.

*Example 7*

A molding powder was prepared by mixing 20.3 parts of N-glycidylphthalimide and 10.9 parts of pyromellitic dianhydride (one anhydride group for each epoxide group) in a Waring Blendor until the mixture was able to pass through a 150-mesh screen. The powder mixture was packed into an unheated mold. The mold was then placed in an oven at 220° C. and cured for four hours. A clear, transparent, light-colored resinous composition was obtained which had a heat distortion temperature of 195° C. The mixture gelled with sufficient rapidity to indicate that it would be suitable for use in compression molding where, if the number of available molds was limited, the resin may be removed from the mold after a few minutes and may be postcured, if desired.

As shown by the examples, excellent results were obtained by curing in a relatively short period N-glycidylphthalimide, a solid monoepoxide melting above room temperature, with a higher-melting dianhydride compound to give resinous compositions having heat distortion temperatures as high as 240° C. and having good chemical and solvent resistance. The solid "one-package system" which contains no solvent, diluent, or catalyst has an indefinite pot life at room temperature. Only when N-glycidylphthalimide is heated at or above its melting point does it become fluid and function as a solvent-reactant for the dianhydride compound.

The heat distortion temperatures of resinous compositions obtained by curing N-glycidylphthalimide are found generally to be significantly higher than those of resinous compositions obtained by curing other types of monoepoxides, for example, glycidyl ethers or esters, containing no nitrogen linkage. As was stated previously, the tertiary nitrogen atom of N-glycidylphthalimide is believed to contribute to high-temperature stability of the cured resinous compositions because the glycidyl group, linked to the benzene ring through the nitrogen atom, is thought to have a lesser degree of flexibility than if it were linked to the benzene ring through an ether oxygen. For example, when a mixture of phenyl glycidyl ether (a liquid monoepoxide) and pyromellitic dianhydride (0.85 anhydride group was provided for each epoxide group) was heated until the clear point (175° C.) was reached and then cured at 180° C. for a period of 18 hours, a resinous composition having a heat distortion temperature of only 114° C. was obtained. Moreover, an amine catalyst was required for curing the above composition which thus had a limited pot life at room temperature.

When a glycidyl ester was cured with pyromellitic dianhydride, cured resinous compositions were obtained having even lower heat distortion temperatures than those of the glycidyl ether compositions. For example, when a mixture of glycidyl benzoate (a liquid monoepoxide) and pyromellitic dianhydride (0.80 anhydride group was provided for each epoxide group) was heated to the clear point (155° C.) and then cured at 180° C. for a period of 18 hours, a cured resinous composition having a heat distortion temperature of only 109° C. was obtained.

The time needed to cure the formulation will vary from instance to instance, and may range from several minutes to several hours, depending mainly on the temperature at which the cure is effected. As is shown in Example 1, high heat distortion temperatures were attained regardless of whether the formulation was cured for a period of only 30 minutes or for as long as 24 hours. As can be seen from Example 1, the heat distortion temperature increases with an increase in the cure period up to a certain limit whereupon a very small or no increase at all occurs. When the formulation was cured for 4 hours, a resinous composition having a heat distortion temperature of 227° C. was obtained, whereas when the formulation was cured for 18 hours, a resinous composition having a heat distortion temperature of 232° C. was obtained. Generally, a cure period of about 4 hours is sufficient since, as exemplified, an increase of only 5° C. in the heat distortion temperature resulted upon curing the formulation for an additional 14 hours. Cure periods may exceed 24 hours; however, no economic advantage entails therefrom. As shown in Example 2, when the cured resinous compositions are subjected to high temperatures for long periods, they exhibit high-temperature stability at the elevated temperature.

The temperature at which the cure is effected must be high enough to allow sufficient dianhydride compound to dissolve in the N-glycidylphthalimide. The method of curing is not critical, for example, the mixture may be heated to the clear point which is generally between about 150 and about 170° C., poured into an unheated or preheated mold, and then cured from about 80° to about 250° C. Alternatively, the mixture of N-glycidylphthalimide and dianhydride compound may be heated, with stirring, until a slurry is formed, poured into a mold preheated to 180° C., and then cured from about 80 to about 250° C. In still another alternative as shown in Example 7, the N-glycidylphthalimide and dianhydride solid mixture may be placed in an unheated mold and cured at about 180° C. to 250° C.

Below a temperature of 80° C., insufficient crosslinking occurs and the heat distortion temperature is lowered, and above 250° C., the cured resin darkens considerably and the heat distortion temperature is also lowered. The lower the temperature at which curing takes place, the more time is required to obtain a cured resin having approximately the same heat distortion temperature as that of a resin cured at higher temperature for a shorter period. The optimum curing schedule (time-temperature relationship) in most cases has been found to be about 4 hours at about 180° C., but again these values may vary considerably depending on the properties desired of the cured resins and like factors generally.

The present invention is applicable to compositions containing aliphatic, cycloaliphatic, aromatic, or heterocyclic imides or mixtures thereof having a maximum of one epoxide group per molecule. For example, N-glycidylsuccinimide may be used.

The dianhydride compounds which may be used in the process of the invention may be the dianhydrides of saturated or unsaturated aliphatic, cycloaliphatic, aromatic, and heterocyclic polycarboxylic acids. For example, when 10.3 parts of all-cis-1,2,3,4-cyclopentanetetracarboxylic dianhydride was added to 20.3 parts of N-glycidylphthalimide (one anhydride group was provided for each epoxide group) and the mixture was heated to the clear point (160° C.), a light-amber cured resinous composition was obtained upon curing the mixture at 180° C. for a period of 18 hours. Similar results may be obtained by using other dianhydrides, such as bis(3,4-dicarboxyphenyl)sulfone dianhydride and those obtained by the condensation of cyclopentadiene and derivatives thereof with anhydrides of polycarboxylic acids, for example, phthalic and maleic acids, and by the condensation of maleic anhydride with unsaturated oils, for example, linseed oil. Pyromellitic dianhydride is the preferred dianhydride compound.

The dianhydride must be present in an amount such that from about 0.5 to about 1.5 anhydride groups are provided for each epoxide group. When less than 0.5 anhydride group is provided for each epoxide group, the heat distortion temperature of the cured resinous composition is lowered and the composition becomes weak and brittle. When more than 1.5 anhydride groups are provided for each epoxide group, again, the heat distortion temperature is lowered and the cured composition becomes brittle. The optimum ratio of anhydride to epoxide group is from about 0.9 to about 1.1 anhydride groups for each epoxide group.

Modifiers, such as mono- and polyhydric alcohols and epoxidized silicone resins, may be added to the compositions of the invention, as shown by Examples 5 and 6. The modifiers decrease the brittleness and improve the mechanical properties of the cured resinous composition. If an excess amount of modifier is added, the heat distortion temperature may be appreciably lowered. Generally, the modifier should be present in amounts not greater than 25 parts per 100 parts of monoepoxide.

The present invention is described in detail in the foregoing. However, it will be apparent that many variations may be introduced without departure from the scope of the invention. I intend, therefore to be limited only by the following claims.

I claim:

1. The reaction product of a composition comprising N-glycidylphthalimide and a dianhydride compound, the amount of said dianhydride compound being that which provides between about 0.5 and about 1.5 anhydride groups for each epoxide group of said N-glycidylphthalimide.

2. A process which comprises dissolving a dianhydride compound in N-glycidylphthalimide, the amount of said dianhydride compound being that which provides between about 0.5 and 1.5 anhydride groups for each epoxide group of said N-glycidylphthalimide and heating the resulting mixture to a temperature between about 80 and 250° C.

3. A composition of matter comprising a solid, physical admixture of N-glycidylphthalimide and a dianhydride compound, the amount of said dianhydride compound being from about 20 to about 45% by weight of said admixture.

4. The reaction product of a composition as claimed in claim 1, wherein the dianhydride compound is pyromellitic dianhydride.

5. The reaction product of a composition as claimed in claim 1, wherein the dianhydride compound is all-cis-1,2,3,4-cyclopentanetetracarboxylic dianhydride.

6. A process as claimed in claim 2, wherein the dianhydride compound is pyromellitic dianhydride.

7. A process as claimed in claim 2, wherein the dianhydride compound is all-cis-1,2,3,4-cyclopentanetetracarboxylic dianhydride.

8. A composition of matter as claimed in claim 3, wherein the dianhydride compound is pyromellitic dianhydride.

9. A composition of matter as claimed in claim 3, wherein the dianhydride compound is all-cis-1,2,3,4-cyclopentanetetracarboxylic dianhydride.

10. The reaction product of a composition as claimed in claim 1, wherein a modifier selected from the group consisting of alcohols and epoxidized silicone resins is included.

11. The reaction product of a composition as claimed in claim 10, wherein the said modifier is 2,2-bis[4-(2-hydroxypropoxy)phenyl]propane.

12. The reaction product of a composition as claimed in claim 10, wherein the modifier is 1,3-bis[3-(2,3-epoxypropoxy)propyl]tetramethyldisiloxane.

References Cited in the file of this patent

UNITED STATES PATENTS 2,730,531   Payne et al. _____ Jan. 10, 1956

FOREIGN PATENTS 788,806   Great Britain _____ Jan. 8, 1958